United States Patent
Borgstrom

[11] Patent Number: 5,856,634
[45] Date of Patent: Jan. 5, 1999

[54] RECOVERABLE ARTICLE

[75] Inventor: Alan Borgstrom, Hackettstown, N.J.

[73] Assignee: Raychem Corporation, Menlo Park, Calif.

[21] Appl. No.: 820,188

[22] Filed: Mar. 19, 1997

[51] Int. Cl.$^6$ .................................................. H01B 7/00
[52] U.S. Cl. .................... 174/135; 174/138 F; 428/36.91
[58] Field of Search ........................... 174/211, 138 R, 174/138 F, 167, 135, DIG. 8, 35 C, 84 R, 73.1, 35 R, 93, 74 A; 428/36.91; 138/109, 141, 178

[56] References Cited

U.S. PATENT DOCUMENTS

| | | | |
|---|---|---|---|
| 3,466,210 | 9/1969 | Wareham | 156/86 |
| 3,515,798 | 6/1970 | Sievert . | |
| 3,770,876 | 11/1973 | Post | 174/88 R |
| 3,824,331 | 7/1974 | Mixon, Jr. et al. | 174/135 |
| 4,016,356 | 4/1977 | McLoughlin | 174/35 R |
| 4,070,746 | 1/1978 | Evans et al. | 29/450 |
| 4,179,320 | 12/1979 | Midgley et al. | 156/86 |
| 4,194,750 | 3/1980 | Sovish et al. | 277/615 |
| 4,233,731 | 11/1980 | Clabburn et al. | 29/859 |
| 4,347,402 | 8/1982 | Reyners | 174/91 |
| 4,410,009 | 10/1983 | Blum | 138/109 |
| 4,559,973 | 12/1985 | Hane et al. | 138/138 |
| 4,645,888 | 2/1987 | Barkan et al. | 200/83 W |
| 4,700,258 | 10/1987 | Farmer | 361/39 |
| 4,758,171 | 7/1988 | Hey | 439/181 |
| 4,762,501 | 8/1988 | Borgstrom et al. | 439/131 |
| 5,114,357 | 5/1992 | Luzzi | 439/183 |
| 5,215,475 | 6/1993 | Stevens | 439/206 |
| 5,230,640 | 7/1993 | Tardif | 439/578 |
| 5,421,750 | 6/1995 | Crotty | 439/801 |

FOREIGN PATENT DOCUMENTS

| | | | |
|---|---|---|---|
| 2107383 | 4/1994 | Canada | B29C 63/42 |
| 0 504 035 B1 | 9/1992 | European Pat. Off. | H02G 15/184 |
| 0 530 952 B1 | 3/1993 | European Pat. Off. | B29C 61/06 |
| 0 590 469 A1 | 4/1994 | European Pat. Off. | B29C 61/06 |
| 0 590 469 B1 | 4/1994 | European Pat. Off. | B29C 61/06 |
| 58-179634 | 10/1983 | Japan | B29H 7/00 |
| 2 018 527 | 10/1979 | United Kingdom | H02G 15/08 |
| 1 556 677 | 11/1979 | United Kingdom | H02G 15/08 |
| 2162000 | 1/1986 | United Kingdom | 174/93 |

*Primary Examiner*—Dean A. Reichard
*Assistant Examiner*—Dhiru R. Patel
*Attorney, Agent, or Firm*—Yuan Chao; Herbert G. Burkard

[57] ABSTRACT

A recoverable article includes an inner resilient radially elastomeric tubular member 2 that is held in its expanded configuration by an outer relatively rigid shell 6. The interface between the member 2 and the shell 6 comprises a plurality of circumferentially-spaced parallel strips 4 coated onto the member 2. The strips 4 prevent the shell 6 from bonding to the member 2 in those regions. The shell 6 is castellated with its valleys 12 adjacent the edges of the strips 4. The lands 8 of the castellated shell 6 overlying the strips 4 can be peeled back to permit the resilient member 2 to recover towards its original configuration, for example around a power cable splice.

10 Claims, 1 Drawing Sheet

RECOVERABLE ARTICLE

BACKGROUND OF THE INVENTION

This invention relates to a recoverable article for, and method of, enclosing an elongate substrate. The substrate may comprise for example a cable, which may be an electrical power or telecommunications cable, and in particular a cable connection. The cable connection may comprise a joint, or splice, between two, or more, cables, or a termination of a cable, for example onto a terminating lug or bushing connected to electrical equipment such as switchgear or a transformer. The termination may comprise an adapter, for example an elbow.

The invention will be further particularly described with reference to an in-line joint between two electric power cables, but it is to be understood that this is by way of example only and not by way of limitation.

Joints between two power cables, whether either or both are polymeric or paper insulated cables, need to be enclosed within a protective arrangement that includes an electrically insulating layer. Heat shrink technology has been applied for this purpose for many years, with products available from Raychem and others. However, technologies that do not require heat are also employed. Push-on sleeves and elbows are available but unlike heat shrinkable products, these have severe range-taking limitations that necessitate a large inventory. Other so-called cold applied solutions require a tubular elastomeric sleeve to be radially expanded and mounted on a rigid holdout member, the internal diameter of which is larger than the maximum outer diameter of the cable joint to be enclosed. One example of the latter is the PST sleeve available from 3M, as exemplified in U.S. Pat. No. 3,515,798. Such a sleeve has an inner holdout member that consists of a continuous narrow strip of tough flexible material in the form of a rigid closed helix having adjacent coils interconnected. The held-out sleeve is mounted over the cable joint and the helical strip is then unwound, thus allowing the insulating stretched elastic cover to shrink down onto the joint. However, it is inconvenient having to unwind the holdout strip helically around the extended cable, especially if the work has to be done in the confined space of a trench or manhole. Another example of a cold applied arrangement is disclosed in U.S. Pat. No. 3,824,331 (AMP), in which a resilient tubular cover is supported in a stretched condition by an easily removable external one piece support member, each end of the cover being rolled back over the outside of the support. The cover and support member are mounted on an internal sleeve in the form of a longitudinally slit tube held in a state of increased diameter by a dividing strip in the shape of an I-beam. When in position over the cable joint, removal of the dividing strip longitudinally from the slit allows the inner tube to be squeezed and then freely withdrawn from the cover. The cover ends are then unrolled onto the adjacent cable sections and the external support member is removed. It will be appreciated that such an arrangement requires an inner and an outer holdout member, each of which has to be removed. EP-B-0530952 (3M) discloses a cover assembly in which an elastomeric tube is held out in a stretched condition on an inner support core. The core is frangible such that application thereto of a force beyond that produced by the tube causes breakage of the core so as to allow contraction of the elastomeric tube onto the substrate. The fragments of the collapsed core remain within the tube and must therefore be as small as possible to facilitate accommodation therewithin.

With each of these arrangements, the holdout member is disposed internally of the sleeve that is to be applied to the substrate cable. Thus, the sleeve cannot conveniently have an internal coating, of gel, mastic or adhesive for example, applied thereto. This problem is avoided by the recoverable sleeve assembly disclosed in U.S. Pat. No. 4,410,009 (Sigmaform), in which an inner elastomeric tube is maintained in a radially-stretched condition by having an outer rigid tube surrounding and secured to the outer surface thereof. The outer tube is a rigid thermosetting adhesive polyurethane whereby the outer tube is sufficiently adhesive to hold the inner tube in its stretched condition but will peel from the inner tube upon impact of force. U.S. Pat. No. 4,070,746 (Raychem) discloses a recoverable tubular article in which an elastomeric sleeve is retained in a radially expanded condition by an outer constraint that is bonded thereto. The restraint is sufficiently strong to retain the sleeve in its expanded form under ordinary conditions of storage, but is susceptible to attack by solvents that weaken the bond sufficiently to allow the elastomeric sleeve to peel away from the restraint and to recover towards its original state. U.S. Pat. No. 4,233,731 (Raychem) discloses a dimensionally-recoverable article comprising a hollow resilient member which has been expanded to a dimensionally unstable configuration in which it is retained by a keeper positioned between and separating two parts of the hollow member away from the path of recovery thereof. The keeper is made from a material that weakens or changes its shape upon heating and/or chemical treatment, for example by being chemically degradable when subjected to a solvent. In one embodiment a single wedge of fusible material is interposed in the break in the circumference of a split tube of beryllium copper alloy. In another embodiment a tubular member made from an engineering plastics material has dovetailed protuberances on its outer surface between which strips of a polycarbonate are inserted to maintain the expanded configuration. EP-A-0,590,469 (Kabelmetal) discloses a recoverable elastomeric tubular article that is held in its expanded state by thermoplastic bracing means in the form of a profile applied helically to the outer surface of the expanded tube.

BRIEF SUMMARY OF THE INVENTION

It is an object of the present invention to provide a recoverable article and its method of manufacture, in which the article is held out in its expanded configuration by an advantageous external holdout means so as not to interfere with any inner layer, of gel, adhesive or mastic material for example, which may be applied internally thereof as a coating or which may be located around the substrate to be enclosed.

Thus, in accordance with one aspect of the present invention, there is provided a recoverable article comprising an inner resilient tubular member that is held out in a laterally expanded configuration by engagement with outer holdout means, wherein the holdout means has a first portion that is bonded to the inner member only at peripherally spaced apart regions thereof, and a second portion that is not bonded to the inner member, whereby the first portion of the holdout means is separable from the second portion to allow recovery of the inner member towards its unexpanded configuration.

Preferably, the first and second portions of the holdout means comprise strips extending longitudinally of the article, preferably parallel to one another, and preferably parallel to the longitudinal axis of the article.

The article may have material coated at peripherally spaced apart regions on the outer surface thereof, thereby to define the second portions of the holdout means. In such an embodiment, the holdout means may then conveniently be applied to, for example moulded over, the entire outer surface of the tubular member, whilst allowing subsequent removal of the second portions overlying the coating to which they have not adhered. This removal may be facilitated by providing a relatively thin wall portion in the holdout means between each first and second portion thereof. Such a configuration may be achieved by castellating the holdout means.

One, and preferably both, of the inner tubular member and the holdout means is advantageously formed of polymeric, for example elastomeric, material.

In accordance with another aspect of the present invention, there is provided a method of manufacturing a recoverable article that comprises an inner resilient tubular member that is held out in a laterally expanded configuration by engagement with outer holdout means, comprising the steps of:

(a) forming a resilient tubular member;

(b) expanding the resilient member into a laterally expanded configuration;

(c) applying intermediate strips of material longitudinally at peripherally spaced apart regions to the outer surface of the expanded tubular member, thereby substantially to prevent an outer member from bonding to the tubular member in those regions; and (d) forming an outer holdout member around the inner tubular member and the intermediate strips so as to form a bond with the exposed surface of the inner member, and such that the outer member is relatively thin at the edges of each intermediate strip, whereby regions of the outer member overlying the intermediate strips may subsequently be removed thereby to allow the inner member to recover towards its unexpanded configuration.

The invention also provides a substrate, for example an electrical substrate such as a cable joint, termination or elbow, enclosed within a recovered article according to the said one aspect of the invention, or made by a method according to said another aspect of the invention.

A recoverable article, and its method of manufacture, each in accordance with the present invention, will now be described, by way of example, with reference to the accompanying drawings.

BRIEF DESCRIPTION OF THE DRAWING(S)

FIG. 1 is a partial end view of an article of this invention, while FIG. 2 is a partial plan view of the same.

DETAILED DESCRIPTION OF THE INVENTION

Figure 1:
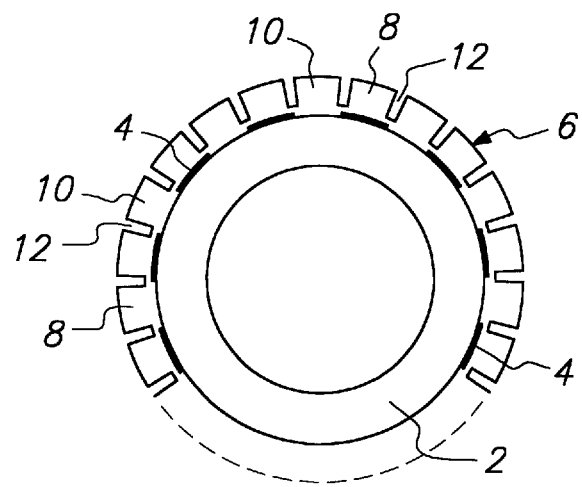

Referring to the Figures, an elastomeric cylindrical tubular member 2 is expanded to the desired internal diameter for subsequent recovery around a substrate (not shown). A coating of material is applied to the outer surface of the tube 2 in the form of strips 4 that are equally spaced apart and that extend longitudinally parallel to one another and to the axis of the tube 2. The striped, expanded tube 2 is then placed into a mould (not shown) into which is injected polyethylene so as to form a relatively rigid holdout shell 6 around the tubular outer surface. The materials of the tube 2, strips 4 and shell 6 are selected such that after the moulding operation, the shell 6 forms a bond with the outer surface of the tube 2 at regions where the strips 4 are absent, and the shell 6 does not bond to the strips 4. The expansion means (not shown) can then be removed, and the elastomeric tube 2 is held in its radially expanded configuration by the outer shell 6.

The outer surface of the shell 6 is castellated with broad lands (or raised regions) 8, 10 overlying the coated and uncoated portions respectively of the outer surface of the tubular member 2, and narrow valleys 12 interspersed between the lands at each edge of each strip 4. At these edges, therefore, the shell 6 is relatively thin and allows those strips of lands 8 that overly the strips 4, and to which they are not bonded, to be peeled away. The outer surface of the tubular member 2 then comprises a plurality of widely spaced apart lands 10. The holdout effect of the shell 6 is thus destroyed, since the recovery forces within the tube 2 tending to return it to its original, smaller diameter, will be effective in pulling the outer surface radially inwards, and the bonded shell lands 10 will be able to move closer circumferentially, until the tube 2 has recovered fully on to the substrate (not shown).

Figure 2:
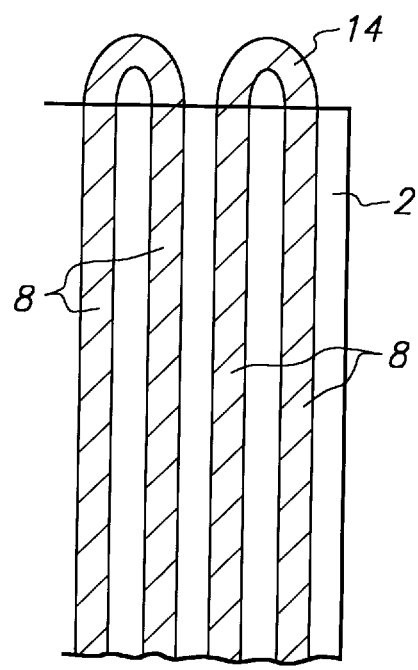

The removal of the unbonded lands 8 of the holdout shell can be facilitated by the provision of pull tabs 14, which can conveniently be paired together as shown in FIG. 2.

The foregoing detailed description of the invention includes passages which are chiefly or exclusively concerned with particular parts or aspects of the invention. It is to be understood that this is for clarity and convenience, that a particular feature may be relevant in more than just the passage in which it is disclosed, and that the disclosure herein includes all the appropriate combinations of information found in the different passages. Similarly, although the various figures and descriptions herein relate to specific embodiments of the invention, it is to be understood that where a specific feature is disclosed in the context of a particular figure, such feature can also be used, to the extent appropriate, in the context of another figure, in combination with another feature, or in the invention in general.

Further, while the present invention has been particularly described in terms of certain preferred embodiments, the invention is not limited to such preferred embodiments. Rather, the scope of the invention is defined by the appended claims.

What is claimed is:

1. A recoverable article comprising an inner resilient tubular member that is held out in a laterally expanded configuration by engagement with outer holdout means, wherein the holdout means has a first portion that is bonded to the inner member only at peripherally spaced apart regions thereof, and a second portion that is not bonded to the inner member, whereby the first portion of the holdout means is separable from the second portion to allow recovery of the inner member towards its unexpanded configuration.

2. An article according to claim 1, wherein the first and second portions of the holdout means comprise strips extending longitudinally of the article, preferably parallel to one another.

3. An article according to claim 1 having material coated at peripherally spaced apart regions on the outer surface thereof, thereby to define the second portions of the holdout means.

4. An article according to claim 1, wherein the holdout means is of castellated configuration.

5. An article according to claim 1, wherein the inner member comprises a substantially cylindrical tube.

6. An article according to claim 1, wherein the holdout means is formed from polymeric material.

7. An article according to claim 1, wherein the inner tubular member is made from polymeric material.

8. An electrical substrate having recovered thereonto an article according to claim 1.

9. A method of manufacturing a recoverable article that comprises an inner resilient tubular member that is held out in a laterally expanded configuration by engagement with outer holdout means, comprising the steps of:

(a) forming a resilient tubular member;

(b) expanding the tubular member into a laterally expanded configuration;

(c) applying intermediate strips of material longitudinally at peripherally spaced apart regions to the outer surface of the expanded tubular member, thereby substantially to prevent an outer holdout means from bonding to the tubular member in said regions; and (d) forming said outer holdout means around the tubular member and the intermediate strips so as to form a bond with the surface of the tubular member not covered by said intermediate strips, and such that the outer holdout means is relatively thin at the edges of each intermediate strip, whereby regions of the outer holdout means overlying the intermediate strips may subsequently be removed thereby to allow the tubular member to recover towards its unexpanded configuration.

10. A method according to claim 9, wherein the step of forming at least one of the resilient tubular member and the outer member comprises moulding.

* * * * *